United States Patent [19]
Cobb

[11] Patent Number: 4,987,608
[45] Date of Patent: Jan. 29, 1991

[54] MOUNTING MEANS FOR USE OF GROUND SYSTEM TYPE GOGGLES AS AVIATORS GOGGLE

[75] Inventor: Bernard A. Cobb, Tucson, Ariz.

[73] Assignee: The United States of America as represented by the Secretary of the Army, Washington, D.C.

[21] Appl. No.: 406,490

[22] Filed: Sep. 13, 1989

Related U.S. Application Data

[63] Continuation-in-part of Ser. No. 213,820, Jun. 30, 1988, abandoned.

[51] Int. Cl.$^5$ .............................. A42B 3/02; A42B 1/24
[52] U.S. Cl. ................................................. 2/6; 2/422; 2/453
[58] Field of Search .................. 2/6, 10, 422, 424, 427, 2/428, 429, 453

[56] References Cited

U.S. PATENT DOCUMENTS

| | | | |
|---|---|---|---|
| 2,445,203 | 7/1948 | Bowers | 2/10 |
| 2,649,019 | 8/1953 | Hartlin et al. | 2/453 X |
| 2,757,574 | 8/1956 | Thorburn | 2/453 X |
| 4,689,834 | 9/1987 | McCarthy et al. | 2/422 |
| 4,734,939 | 4/1988 | Copp | 2/422 |
| 4,907,296 | 3/1990 | Blecha | 2/6 |
| 4,918,752 | 4/1990 | Briggs | 2/6 |

FOREIGN PATENT DOCUMENTS

| | | | |
|---|---|---|---|
| 1559663 | 5/1970 | Fed. Rep. of Germany | 2/10 |
| 3427692 | 1/1986 | Fed. Rep. of Germany | 2/10 |
| 1418411 | 10/1965 | France | 2/10 |
| 2167644 | 6/1986 | United Kingdom | 2/10 |
| 2168595 | 6/1986 | United Kingdom | 2/6 |
| 2179543 | 3/1987 | United Kingdom | 2/6 |

Primary Examiner—Wm. Carter Reynolds
Attorney, Agent, or Firm—Milton W. Lee; Max L. Harwell; Anthony T. Lane

[57] ABSTRACT

A flip-up mounting bracket for use of a stripped down ground system type night vision goggle on an aviators helmet. The frame and excess padding surrounding the ground system goggle is removed and the mounting bracket is substituted for the frame as a threadable mount for the ground system goggle. The bracket is rotatably connectable to standard aviators night vision imaging system (ANVIS) hardware on the helmet. The mounting bracket and goggles are rotatable about the hardware for stowing the ground system goggles up in the vertical flip-up position or down in the direct view of the pilot for use in night observation.

8 Claims, 6 Drawing Sheets

MOUNTING MEANS FOR USE OF GROUND SYSTEM TYPE GOGGLES AS AVIATORS GOGGLE

The invention described herein may be manufactured, used, and licensed by the U.S. Government for governmental purposes without the payment of any royalties thereon.

This is a continuation-in-part of application Ser. No. 213,820 filed June 30, 1988, now abandoned.

BACKGROUND

The present invention is in the field of goggle mounting systems on an aviators helmet in which a ground system type goggle is modified for use as an aviators goggle. Specifically, a ground system type goggle, such as the U.S. Army AN/PVS-5, night vision goggles, is stripped of facial padding and plastic down to a front frame which holds the goggles and its elecrical system lead lines wherein the stripped goggle is fitted onto a specially designed mounting bracket wherein the mounting bracket is pivotably connectable to standard hardware on an aviators helmet for either positioning the goggle in the line-of-sight of the aviator or in a flip-up to stow position.

Some of the requirements of an aviators goggles are that the mounting system be light weight and have quick vertical flip up to stow position capabilities out of the line of sight of the aviator if use of the goggles is temporarily not required. Another requirement is that the aviators vision be as unrestricted as possible by the mounting system when the goggles are in the line-of-sight of the aviator.

The general ground use type goggles, especially of the night vision goggle type, have been used by helicopter pilots. These ground system goggles are characterized by heavy foam facial padding and plastic surrounding the goggles. Previously, head straps under a helmet have been used to hold these goggles to the aviators head. Also, the goggle systems have been held directly on the outside portion of the aviators helmet by various means, such as by VELCRO or surgical tape. Even then, there are disadvantages of excessive weight, visibility limitations, and lack of flip-up capability out of the line-of-sight of the aviator.

A much lighter weight version of aviators night vision imaging system (ANVIS) goggle exists. However, the number of these goggle available for use is highly limited. The present inventive concept is comprised of a mounting bracket for use with a stripped version of the ground use goggles wherein the mounting bracket with ground use goggles firmly attached thereto may be mounted to standard hardware on an aviators helmet. The present mounting system has the advantages of being lighter, affording more peripheral visibility under the goggles when in the line-of-sight position, and having flip-up to stow capability.

SUMMARY OF THE INVENTION

The invention described herein provides a mounting means of using a stripped down version of available ground use goggle systems attached to a novel mounting bracket wherein the bracket and goggle system are pivotably connectable to standard hardware on an aviators helmet. The standard hardware is a goggle support means comprised of a goggle mount attached to an ANVIS helmet visor cover which is in turn attached to the ANVIS helmet. The goggle mount has channels leading to lock sockets on each side thereof. Also comprised in the standard hardware is a helmet connecting device. The helmet connecting device is comprised of a cylindrical portion which has a spring loaded ball on each end thereof and a generally flat recessed underside base portion having inwardly curved lips on the lateral sides of said underside thereof which was previously used as a frictional attachment directly to the ANVIS goggle. The springs on each of the spring loaded balls are compressed when the cylindrical portion is slide along the channels but the springs expand back so that the balls fit snugly when in the locket sockets. The helmet connecting device is rotatable with respect to the goggle mount about the balls and sockets. The cylindrical portion has two grooves along the longitudinal outer surface. These grooves, known as a stow groove for holding the goggles in the stow position and a line-of-sight groove for holding the goggles in the line-of-sight position interact with a press to release knob controlled spring biased stem on the goggle mount. The spring biased stem is normally biased toward the cylindrical portion, i.e. into one of the grooves to remain in that groove until the release knob is pressed to force the stem back out of the groove so that the cylindrical portion may be rotated so that the helmet connecting device and goggles are rotated away from that position to the other position of the stow or the line-of-sight whereupon the stem is biased into the other groove when the release knob is released.

The mounting bracket is mated with the helmet connecting device by way of a separate attachment plate. The attachment plate is attached to the bracket and has rounded sides over which the inwardly curved lips of the underside of the generally flat base portion of the helmet connecting device is slidably frictionally connectable thereto. The bracket is preferably made in a single piece in the shape of a flat rectangular bridge portion curved at the short ends into generally perpendicular braces, or bracket tab extensions, extending outward on one side of the bridge portion. The ground goggles fit between these two braces, or tab extensions, and are firmly attachable thereto. The braces are beveled outward for a short distance from the bridge portion only on the aviators' facial side of the bracket. Each brace has an elongated slot through which goggle attachment means, such as thumb nail threaded bolts, are passed there through and threaded into existing connecting ports on each side of the goggles. The elongated slots afford eye relief for the individual aviator since the goggles may be moved the proper distance from each aviators eyes and then the thumb ail bolts screw threaded into the connecting ports to secure the goggles to the bracket tab extensions, or braces. The attachment plate is attached to the center of the rectangular bridge portion on the opposite side on the braces.

The mounting bracket is designed to hold a stripped version of the ground system type goggles and specifically to provide increased field of view, easy mount and dismount, and flip-up/flip-down capability for ease of transition between unaided/aided flight vision. The bracket is preferably made of lightweight material, such as plexiglass or aluminum of about 3/16 inch thickness. The bracket has been demonstrated to work with various ground system goggles since common connection ports on each of the goggles may be used for connections with thumb nail bolts which hold the goggles firmly to the bracket. The connect or disconnect of the ground system goggle with the bracket may be easily and quickly accomplished, generally within 10 minutes. Two points of connect/disconnect are by two thumb nail bolts (one on each side of the goggles that pass through elongated slots in the brace portions generally perpendicular to the bridge portion of the bracket) which 'hread into the goggles to hold the goggles firmly to the two braces. Two other connect/disconnect points are by 2 small screws, generally requiring an 5/32" allen wrench, which attach an electrical connector to the brace side of the bridge portion that is tethered by electrical leads from electrical contacts on the helmet connecting device. The goggle electrical system has a wiring harness and electrical plug connector in which the plug connector is plugged into the electrical connector.

The invention will be better understood by reference to the following drawings along with the detailed description.

DETAILED DESCRIPTION OF THE PREFERRED EMBODIMENT

Figure 1:
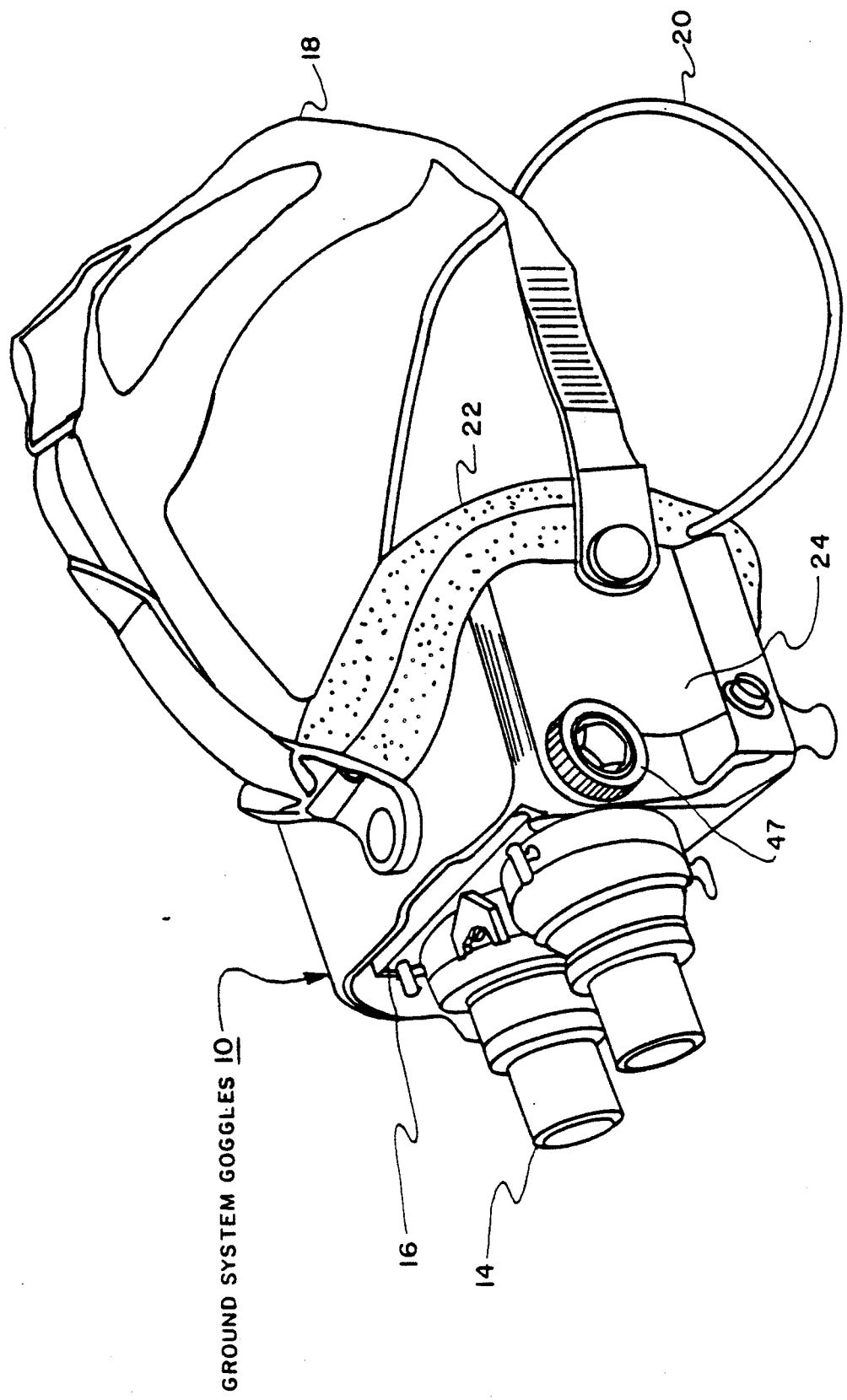
FIG. 1 illustrates a perspective of one of the typical ground system goggles with the ground use straps and face mask.
Figure 2:
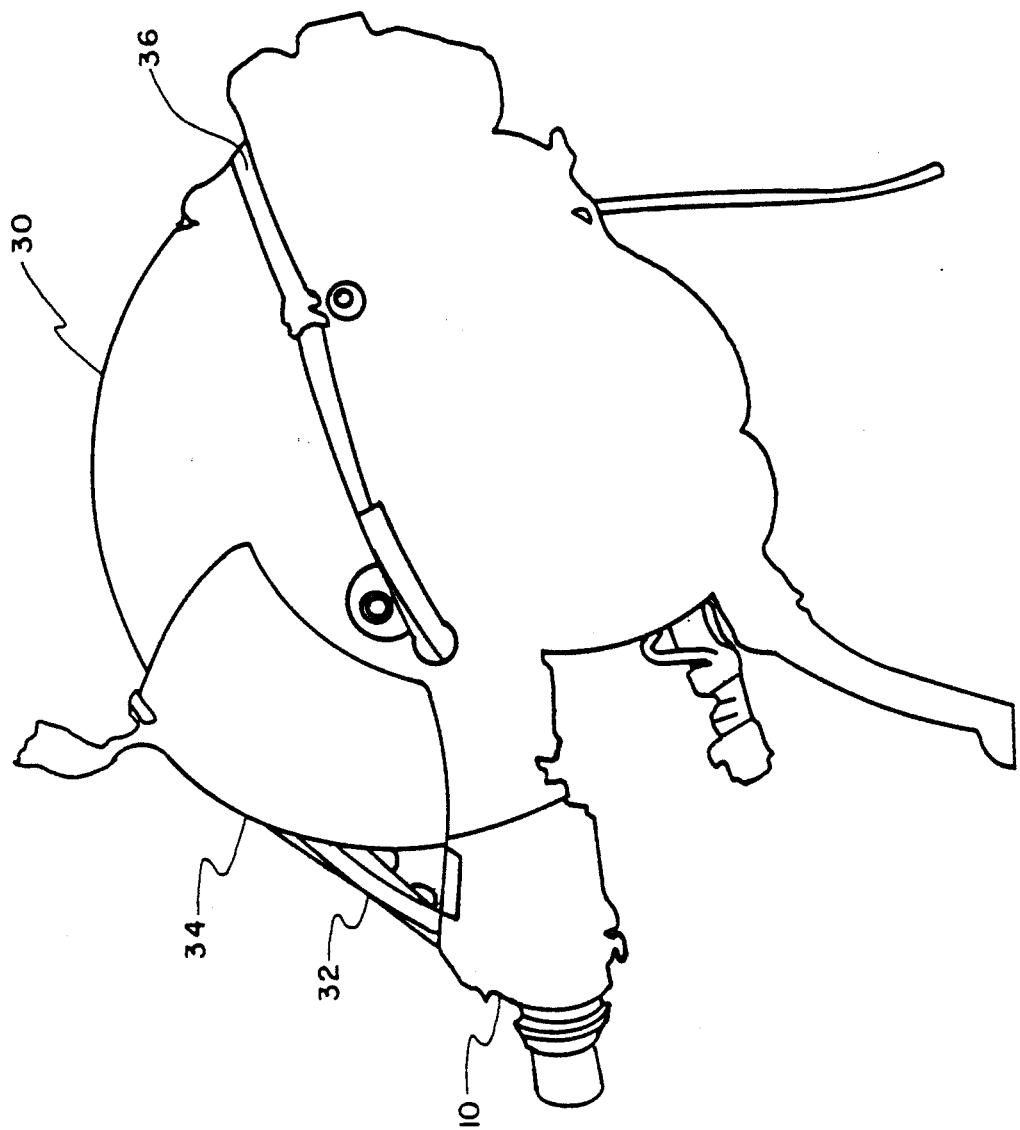
FIG. 2 illustrates a prior art mounting method for mounting a cutaway versions of the ground system goggles onto an aviators helmet.

The novel features of the present invention will be best understood by referring first to FIGS. 1 and 2 for discussion of the prior art ground system goggle and their use as aviators goggles. FIG. 1 illustrates the ground system goggles as tied directly onto the aviator's head and FIG. 2 illustrates the goggles with plastic and foam removed as attached to the aviator's helmet.

It can readily be seen how the ground system goggles 10 as shown FIG. 1 in comprised of a large amount of material that surrounds the goggles. The objective lens 14 of the goggles 10 are shown extending out the front frame 16 of the ground system goggles. Frame 16 primarily holds the goggles. A thumb nail screw 47 has a stem that is threadable into goggles 10 at connecting ports (not shown) to hold the goggles within housing 24. The remainder of the housing 24 is made of plastic which surrounds the goggles. On the facial side of the goggles is a face mask cushion 22, which is made of appropriate foam material for fitting against the face and cheek of the user to shut out ambient light from entering the eyes of the user.

As mentioned above, the goggles 10 as shown in FIG. 1 are for head mounting. A head strap 18 is attached at the top and on both sides of goggle housing 24. The length of strap 18 is adjustable to fit snuggly over the cranium of the aviator. A neck cord 20 may hold the ground system goggles around the neck of the user when the goggles are not actually being used.

FIG. 2 illustrates helmet mounted goggles 10, which is a prior art means of mounting goggles known as the "cutaway" version. The face mask 22 has been removed and most of the housing 24 has been cutaway. The goggles are still held by the front frame 16 (not visible in FIG. 2). Surgical tubing 36 may be connected to goggles either directly or by a mounting face plate and runs around the back of the helmet 30 for securing the goggles to the helmet. The helmet 30 has a visor cover 34 on the front of the helmet shell. Goggles 10 may further be secured to the helmet visor cover 34 by holding straps 32. These holding straps and portions of cover 34 may be made of holding means, such as VELCRO.

Figure 3:
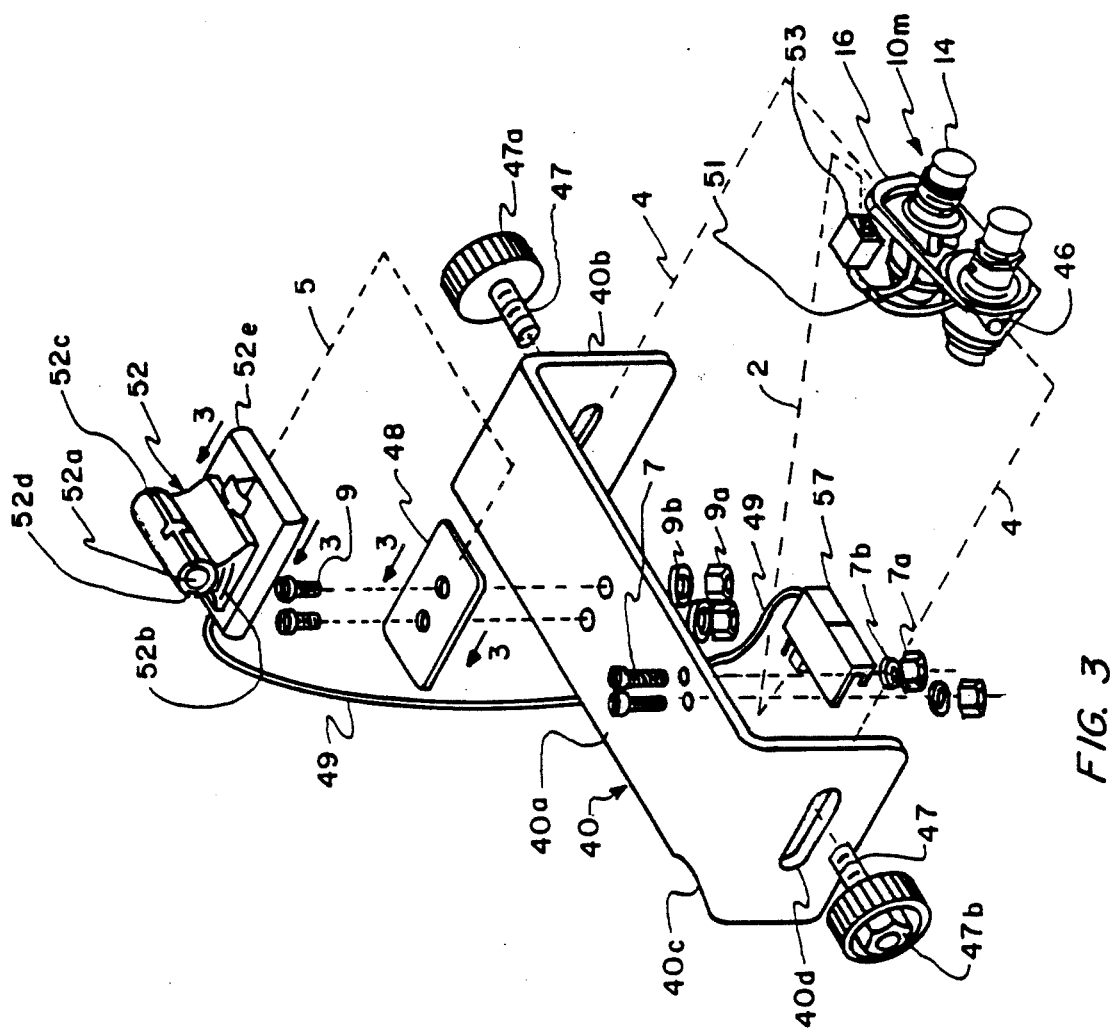
FIG. 3 shows an exploded view of the inventive mounting bracket with a stripped ground system type goggle juxtaposed to the bracket.
Figure 5:
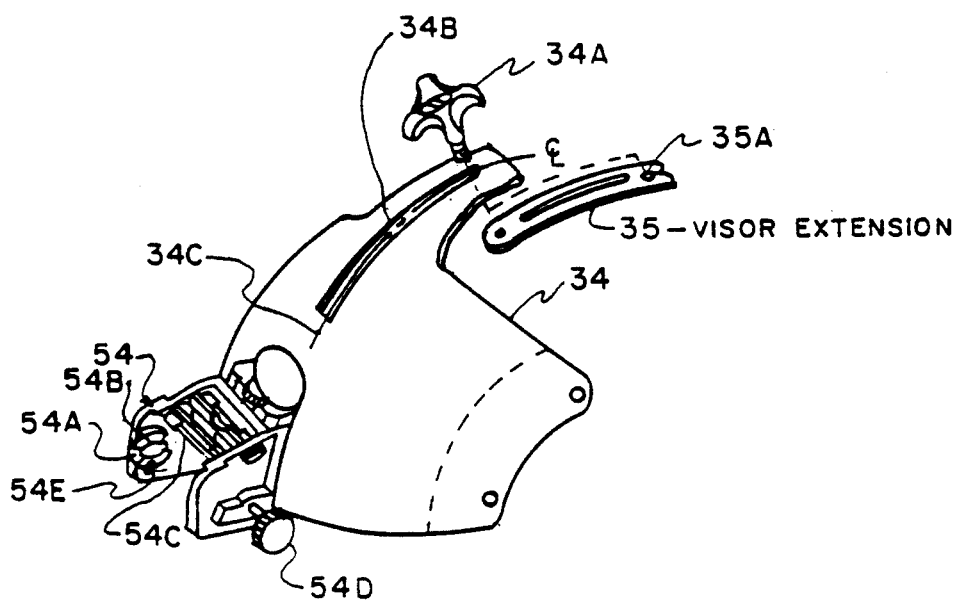
FIG. 5 is an isometric view of the aviators helmet visor cover with goggle mount upon which the mounting bracket and ground system goggles are connected.
Figure 6:
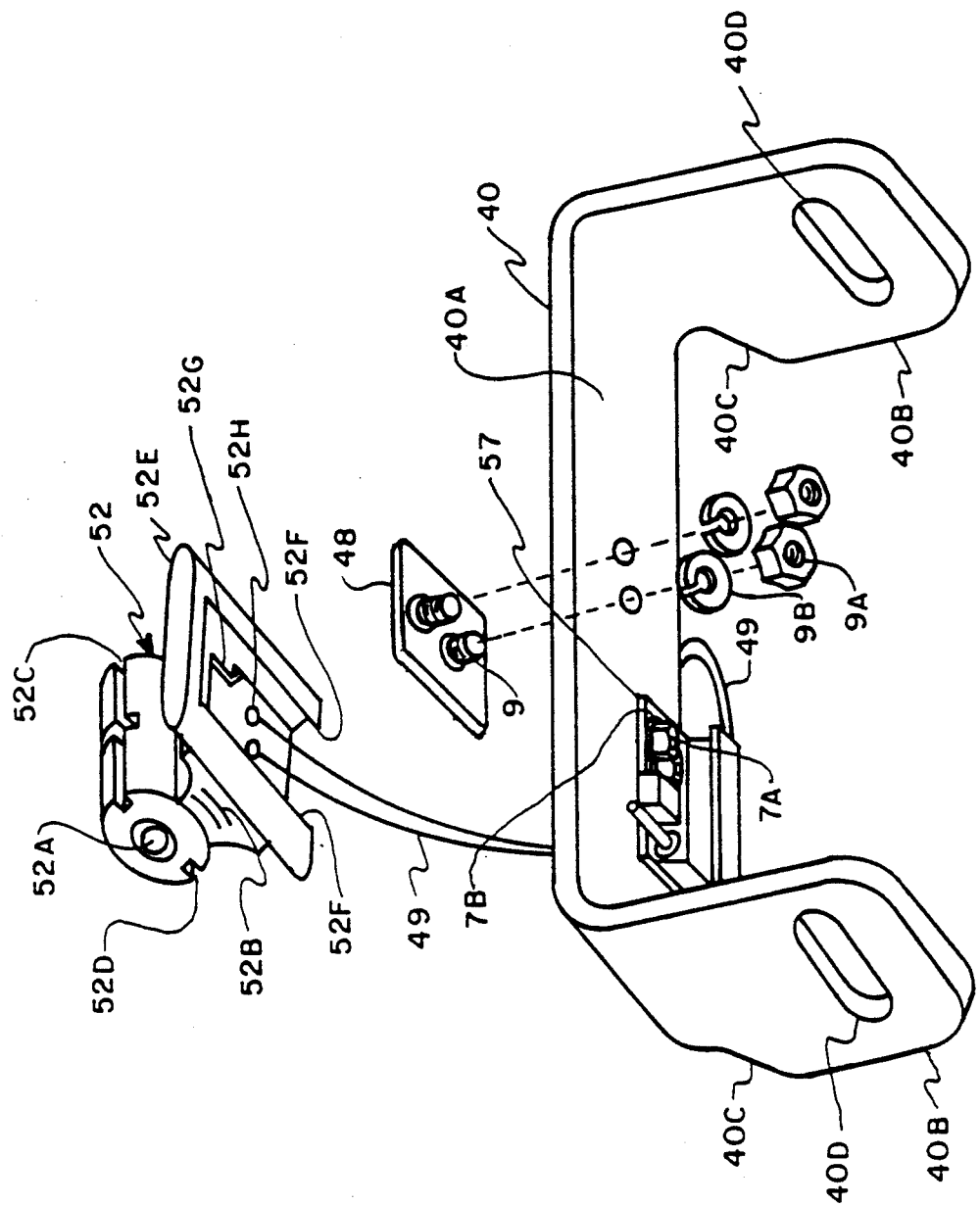
FIG. 6 shows an exploded view of the mounting bracket and the helmet connecting device.
Figure 7:
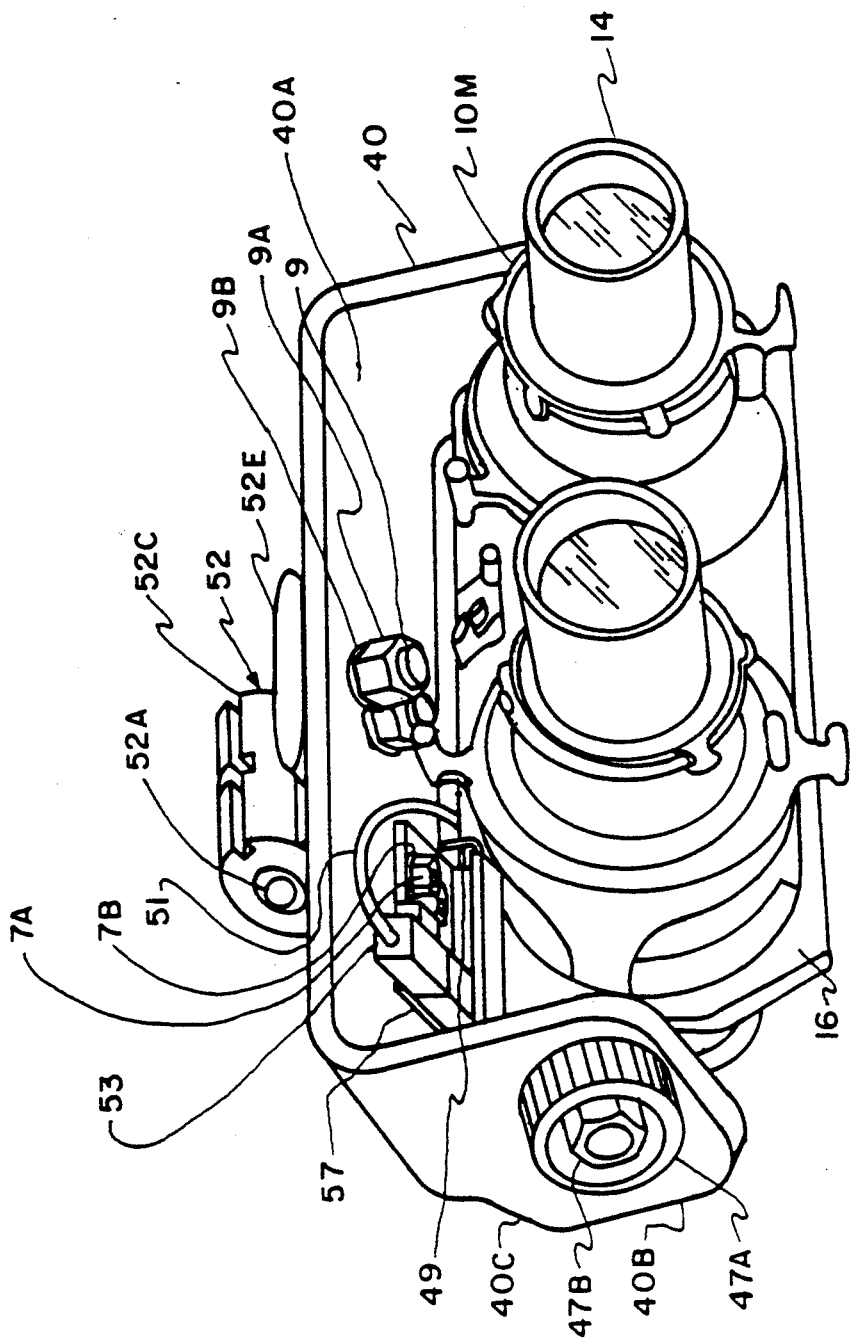
FIG. 7 illustrates the mounting bracket and the stripped goggles attached together for mounting on a goggle support means on an aviators helmet.

FIG. 3, 6, and 7 should be referred to along with the explanation below for a better understanding of the novel mounting means for mounting a stripped ground system goggles 10M on a specially designed mounting bracket 40 wherein the bracket has a goggle attachment means and electrical connector attachment means thereon for securing the goggles 10M and the goggles electrical system plug connector 53 thereto. The mounting bracket 40 also has an attachment plate 48 attachable to the mounting bracket by plate attachment means, such as at least two screws 9 threading through 48 and 40 and held securily by washers 9b and threadable taps 9a. The attachment plate is specifically designed so that a helmet connecting device 52 is frictionally connectable thereto. The helmet connecting device 52, the bracket 40, and the goggles 10M with its electrical system wiring harness 51 and plug connector 53 plugged into an electrical connector 57 attached to bracket 40 by the above noted electrical connector attachment means, such as screws 7 and taps 7a and washers 7b, and tethered by electrical leads 49 to electrical contacts 52H which are electrically connected to electrical conductor strips 52B, are all electrically connected together when ready to mount on an aviators helmet. It should be noted that conductor strips 52B are in electrical contact with electrical contact points 54E on a helmet goggle mount 54, shown in FIG. 5, when the helmet connecting device 52 is connected to the helmet goggle mount 54. Points 54E are electrically connected to a power supply inside helmet 30, thus providing the necessary power to goggles 10M for their operation.

Figure 4:
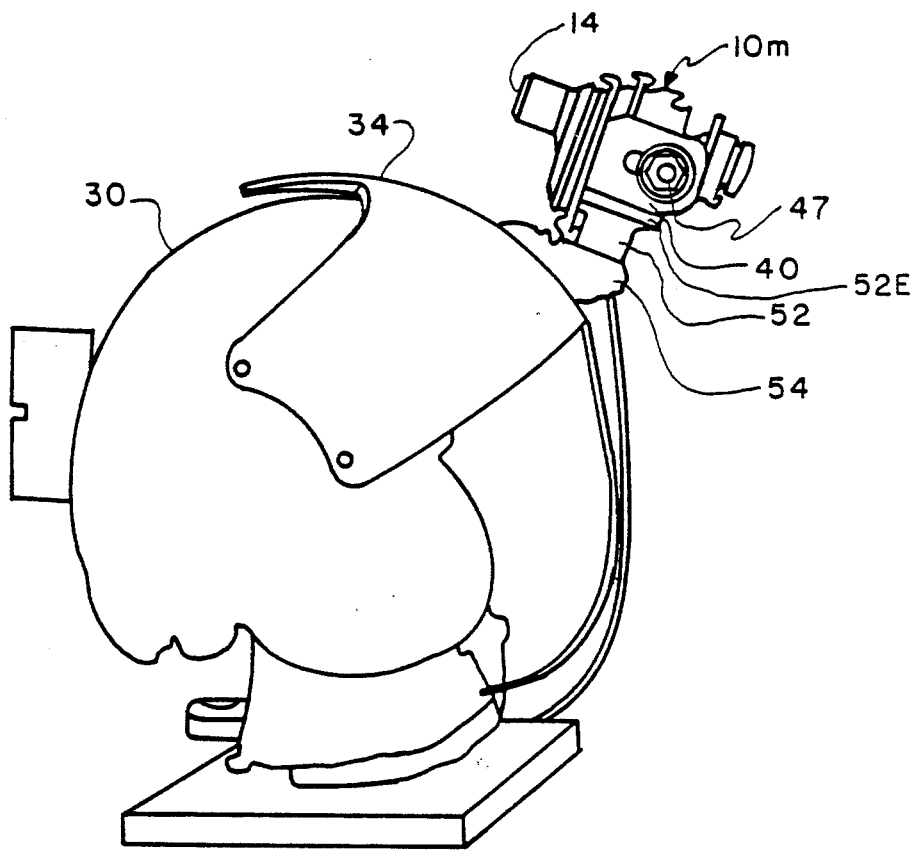
FIG. 4 illustrates the present mounting bracket and ground system goggle mounted in a flip-up position on an aviators helmet.

FIGS. 4 and 5 illustrate a goggle support means for connecting the bracket 40 and goggles 10M to the ANVIS helmet 30, and is comprised of the following. The aviators helmet 30 supports the ANVIS helmet visor cover 34 and the visor cover in turn has a helmet goggle mount 54 attached thereto. The helmet connecting device 52, with the bracket 40 and the ground system goggles 10M attached thereto, is rotatably connectable to 54. Shown in FIG. 5 juxtaposed to 34 is a visor extension 35 which may hold a clear plastic visor (not shown) if the visor is being used at the same time the goggles are being used. Extension 35 is connectable to 34 by a small bolt 34A preferably having a winged knurled head on the outer convex portion of 34 (that the aviator can easily turn) and a stem that extends therefrom through open slot 34B which is screw threadable into opening 35A of the extension. The visor, which if used would be attached to the end of 35 opposite opening 35A is moveable between the aviators line-of-sight and the stow positions by the aviator sliding the bolt 34A stem along the open slot 34B of the cover. It should be noted that the visor is not a part of this invention but is discussed to indicate that it can be used simultaneously with the inventive bracket mount. The helmet goggle mount 54 is generally attached to the lower center front position of 34 but in some instances 54 may be offset by as much as 1 inch or more from the common helmet and visor centerline, indicated at centerline 34C on visor 34. The mount 54 is preferably attached by attachment screws threaded between 34 and 54. Goggle mount 54 is provided with channels 54A and lock sockets 54B on each end thereof (only one each of which can be shown in FIG. 5) wherein the sockets are of the size to frictionally support spring loaded balls 52A (only one which can be shown in FIGS. 3, 6, and 7) on each side of the helmet connecting device 52. FIG. 4 illustrates the assembly of 52, 40, and 10M mounted on the goggle support means 54 with goggles 10M in the overhead stow position on an aviator helmet, with the helmet shown mounted on a pedestal. It can be seen that when the assembly is rotated down to the line-of-sight that lens 14 remain outward from the facial side of 40.

Refer now to FIGS. 3, 6, and 7 for a more specific explanation of the bracket 40 and how the ground system goggles 10M, the electrical power supply to the goggles, and helmet connecting device 52 are attached thereto. First, a discussion of the goggles 10M will show how different they are from the regular ground system goggles 10. Basically, the plastic housing 24 and the face mask cushion 22 have been totally removed leaving the goggles 10M, the front plate 16 and the goggle wiring harness 51 and electrical plug connector 53 intact. The basic goggles 10M are held by the front plate 16. A threaded connecting port 46 on each side of the goggles 10M (with one not shown on the opposite side of the view) are employed in the goggle attachment means. Goggles 10M may be firmly attached to the two braces 40B of the bracket 40 by thumb nut threaded bolts 47 screw threaded into ports 46 in a manner which will be further discussed below.

Electrical connections from a power supply (not shown) within helmet 30 to the goggles 10M are by electrical contact points 54E which is connected to the power supply, electrical conductor strips 52B, when 52 is connected to 54 as explained herein below, electrical contacts 52H, electrically connected to strips 52B, electrical lead 49, electrical connector 57, electrical plug connector 53, and wiring harness 51 to the goggle electrical system. An attachment plate 48 having rounded edges facing the short ends of the bridge portion is attached to the bridge portion 40A of bracket 40 by the plate attachment means. It should be noted that electrical contacts 52H and the ends of the tethered electrical leads 49, are well out of the way of plate 48 since they are in a recessed area 52G of flat base portion 52E. The underside of a generally flat base portion 52E has inwardly curved lipped portions 52F on the two sides thereof which can be slipped over the rounded edges of plate 48 and held securely therewith yet be slidable on and off as needed. Electrical connector 57 is attachable to bracket 40 by a connector attachment means, which is preferably at least two connector screws 7 screw threadable through some portion of 57 and having taps 7A and washers 7B associated therewith for securing screws 7. After 52 and 57 are connected to 40 the goggles 10M are attached to bracket 40 preferably by readily available threading thumb nail bolts 47 which pass through elongated slots 40D and thread into existing threaded connecting ports 46 on each side of the goggles. Each bolt 47 is characterized by a large diameter knurled thumbwheel 47A so that the bolt may be easily manually threaded with ports 46 by the aviator. A locknut 47B on the end of 47 is used to lock and hold 47A in place. When bolts 47 are threaded into ports 46 the goggles are pulled toward the generally perpendicular braces 40B and are firmly held thereto so that the goggles 10M and bracket 40 move as unit. It is noted that the elongated slot 40D in each of of braces 40B allows for adjustment of the goggles to the proper distance from each individual aviators eyes by movement of the goggle prior to threading and securing 47 into 46. The beveled portion 40C of each brace 40B is on the aviators' facial side of bracket 40 and is made purposely to allow some peripheral viewing by the aviator when 40 is in the line-of-sight position which was not possible with the ground system goggle mount. The portion 40C also provides more space for elongated slot 40D and thus more available adjustment of the goggles to the aviator's eyes. Next the helmet connecting device 52 is slidably connected to 48 by maintaining 52 in the direction as shown and moving along phantom line 5 and sliding over plate 48 in the direction indicated by arrowed lines 3, i.e. the inwardly curved lipped portions 52F of base 52E slides under 48 from the side opposite the facial side toward the facial side of 40. Sliding 52 off 48 is accomplished by moving 52 in the opposite direction from arrows 3. The front of 52 is opposite arrow heads 3. The electrical connector 57, which is tethered to 52 by electrical lead 49, is next attached to 40 on the bridge portion 40A between the braces 40B. The goggles 10M are attached to braces 40B by threaded thumb nail bolts 47 passing through slots 40D and threading into the ports 46 on each side of the goggles. It should be noted that ports 46 already exist and that thumb nail bolts 47 may be the same as the thumb nail bolts 12 of the ground use goggles mounting scheme illustrated by the PRIOR ART FIG. 1. Goggles 10M are mounted to bracket 40 by movement along phantom lines 4 while the goggle objective lens 14 are maintained positioned out in the opposite direction from the facial side of 40. The plug connector 53 of the goggle electrical system is plugged into electrical connector 57 as indicated by phantom line 2. The assembly comprising 52, 40, and 10M is therefor completed with the objective lens 14 aimed away from the facial side of 40.

Refer to FIGS. 4 and 5 for further explanation of the present flip-up mount for ground system goggles. As noted above the helmet connecting device 52 is rotatably connected to the helmet goggle mount 54 by the spring loaded balls 52A being pressed along the mount 54 channel recesses 54A into the socket lock portions 54B. With the balls 52A in the sockets 54B not only is the device 52 mechanically held snuggly but electrical connections are made between the electrical connectors 52B and electrical contact points 54E back to the power supply inside the helmet (not shown). FIG. 4 illustrates the goggles 10M in a vertical stow position—one of the main features of this invention for use with ground system goggles. The goggles10M, frame 40, and helmet connecting device 52 are pivotable as a unit with respect to the helmet goggle mount 54 and helmet 30. A retention and release means, comprised of a spring biased long stem 54C and a release knob 54D on the helmet goggle mount 54, is used to retain or release 52, 40, and 10M. Stem 54C is spring locked into or biased outward and released from either a stow groove 52C or a line-of-sight groove 52D which run longitudinally along the generally cylindrical outer surface of 52. Stem 54C is normally spring biased outward in the direction away from visor cover 34 when release knob 54D is in the rest position as shown in FIG. 5, i.e. extended out from 54. However, a stem portion of 54D (not shown) forces stem 54C back toward 34 when 54D is pressed inward by the aviator. Thus, the aviator uses knob 54D to conveniently rotate the helmet connecting device 52, with the bracket 40 and goggles 10M firmly attached thereto, from and to either the line-of-sight or the stow positions with the goggles 10M either in the line-of-sight of the aviator or stowed over the aviator's forehead out of the view of the aviator. When 52, 40, and 10M are in the stow position stem 54C comes to rest in groove 52C to firmly hold 52, 40, and 10M in the stow position. When 10M is down in the line-of-sight stem 54C is at rest in groove 52D.

The specific embodiments disclosed herein are intended to be exemplary of the principles of the invention and variations and modifications may be made without departing from the spirit and scope of the invention as claimed herein below.

I claim:

1. An adapter for coupling a pair of ground system, AN/PVS-5, night vision goggles, having threadable engagement means on both sides thereof, to an ANVIS helmet visor having attached thereto a cylindrical flip up mount with a stationary support means containing an elongated cylindrical opening in which a cylindrical rotatable member may be rotatably inserted for effecting rotational flip up capability for the goggles, wherein said adapter comprises:
   bracket means for coupling the goggles to said cylindrical rotatable member;
   adjustment means for aligning and adjusting the distance between a users eyes and the goggles;
   wherein said bracket means is further composed of a lightweight rigid material of a generally rectangular shape with a tab extension, having a slot therein, extending perpendicularly from each end thereof, whereby the bracket may be placed over the goggles with the tab extensions extending down along side the goggles for aligning the slots in the tabs with said threadable engagement means on each side of the goggles, wherein said adjustment and aligning means further comprises a screw mechanism slidably engaged in the slots of each respective bracket tab and threadably engaged with the threadably engagement means of the goggles to effect the proper alignment of the goggles to a users eyes.

2. A mounting means for mounting ground system type goggles on an aviator helmet, said mounting means comprising:
   a mounting bracket having a rectangular bridge portion curved at the short ends into two generally perpendicular braces which extend outward on the same side of said bridge portion, each of said two braces having beveled portions extending outward for a short distance on a facial side of said bridge forming brace portions that are wider than the short ends of said rectangular bridge portion each of said two braces have an elongated slot therein that is generally parallel with the short ends of said bridge portion;
   a stripped ground system type goggles comprised of the goggles held by a front plate and a goggle electrical system wiring harness and plug connector attached thereto and a threaded connecting port on each side of said goggles;
   an attachment plate attachable on the side of said bridge portion opposite said two braces by a plate attachment means, said attachment plate having rounded edges facing said short ends of said bridge portion;
   a goggle attachment means for attaching said goggles between said two braces with the objective lens of said goggles positioned outward from the side opposite said facial side of said bridge portion wherein said goggles are threadably attachable to said two braces;
   a connecting means for rotatably connecting said mounting bracket with said goggles attached thereto on the front of said helmet, said connecting means comprised of a helmet connecting device connectable to said attachment plate on said bridge portion and a goggle support means mounted on the front of the helmet, rotatable connecting means between said helmet connecting device and said goggle support means wherein said bracket and goggles are rotatable between the line-of-sight of an aviator and an overhead to stow position, and electrical connecter means on said bracket for connecting said plug connector thereto to complete an electrical circuit from a power supply within the helmet to said goggles.

3. A mounting means as set forth in claim 2 wherein said goggle attachment means between said goggles and said two braces is by thumb nail bolts which pass through said elongated slots in each of said two braces and thread into said threaded connecting ports on each side of said goggles.

4. A mounting means as set forth in claim 3 wherein said mounting bracket is made of a light weight material.

5. A mounting means as set forth in claim 3 wherein said mounting bracket is made of plexiglass of about 3/16 inch thickness.

6. A mounting means as set forth in claim 3 wherein said thumb nail bolts are characterized by large diameter knurled outer edge thumb wheel heads for easily threading a threaded stem therefrom with said threaded connecting ports on said goggles.

7. A mounting means as set forth in claim 2 wherein said goggle mount of said goggle support means is mounted at an offset from the centerline of the front of said helmet.

8. A mounting means as set forth in claim 7 wherein said offset from the centerline of the front of said helmet is about one inch.

* * * * *